(12) United States Patent
De Waele et al.

(10) Patent No.: US 7,183,729 B2
(45) Date of Patent: Feb. 27, 2007

(54) MOTOR VEHICLE COMPRISING MEANS FOR VARYING ACCELERATOR PEDAL EXTREME ACTUATED POSITION

(75) Inventors: Gilles De Waele, Rueil Malmaison (FR); Fahri Keretli, Le Mesnil St-Denis (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 10/536,877

(22) PCT Filed: Oct. 16, 2003

(86) PCT No.: PCT/FR03/03050

§ 371 (c)(1),
(2), (4) Date: Jan. 6, 2006

(87) PCT Pub. No.: WO2004/050415

PCT Pub. Date: Jun. 17, 2004

(65) Prior Publication Data

US 2006/0138978 A1     Jun. 29, 2006

(30) Foreign Application Priority Data

Nov. 27, 2002  (FR) .................................. 02 14848

(51) Int. Cl.
*H02P 5/00* (2006.01)
*H02P 1/00* (2006.01)
*H02P 3/00* (2006.01)
*B60I 6/00* (2006.01)
*H02J 7/00* (2006.01)

(52) U.S. Cl. ...................... 318/139; 318/140; 318/560; 180/65.2; 180/65.8; 320/104; 429/9; 429/22

(58) Field of Classification Search ................ 318/139, 318/140, 560; 180/65.2, 65.3, 65.8; 320/104; 429/9, 22, 23
See application file for complete search history.

(56) References Cited

U.S. PATENT DOCUMENTS

| 2,280,186 | A |   | 4/1942  | Caldwell |
| 5,797,467 | A |   | 8/1998  | Watanabe |
| 5,929,594 | A | * | 7/1999  | Nonobe et al. ............. 320/104 |
| 5,964,309 | A | * | 10/1999 | Kimura et al. ............. 180/65.8 |
| 6,158,537 | A | * | 12/2000 | Nonobe ..................... 180/65.3 |
| 6,447,939 | B1 | * | 9/2002  | Iwasaki ......................... 429/9 |
| 6,645,653 | B2 | * | 11/2003 | Kashiwagi ................... 429/22 |
| 2003/0116367 | A1 | * | 6/2003 | Kanno ........................ 180/65.1 |
| 2003/0217559 | A1 | * | 11/2003 | Ieda et al. .................... 62/230 |
| 2006/0113129 | A1 | * | 6/2006 | Tabata ....................... 180/65.2 |

FOREIGN PATENT DOCUMENTS

WO          02/070298          9/2002

* cited by examiner

*Primary Examiner*—Paul Ip
(74) *Attorney, Agent, or Firm*—Oblon, Spivak, McClelland, Maier & Neustadt, P.C.

(57) ABSTRACT

A motor vehicle including an electric drive engine capable of being successively supplied with electric power by two separate electric power sources, in particular by a set of batteries and by a fuel cell, and of the type including an accelerator pedal that is mobile between a rest position and an extreme actuated position corresponding to the maximum power capable of being supplied by the engine based on the amount of electric power available for its powering. A mechanism is provided for varying the extreme actuated position of the pedal on the basis of a parameter representing the amount of electric power available for powering the engine.

10 Claims, 4 Drawing Sheets

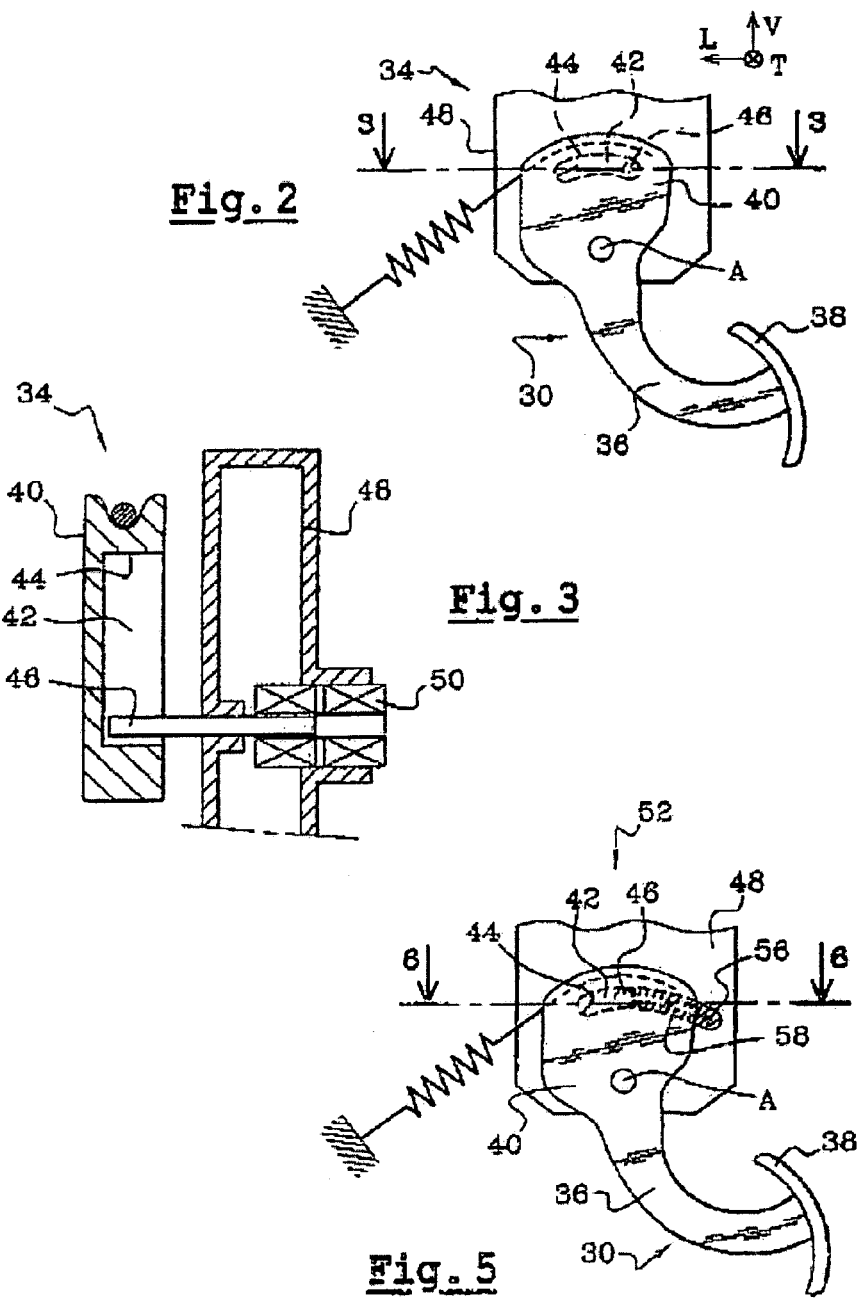

MOTOR VEHICLE COMPRISING MEANS FOR VARYING ACCELERATOR PEDAL EXTREME ACTUATED POSITION

The invention relates to a motor vehicle provided with an electric propulsion motor capable of being supplied with electrical energy by two distinct energy sources.

The invention relates more particularly to a motor vehicle provided with an electric propulsion motor capable of being supplied with electrical energy:

by a first electrical-energy source composed of a fuel-cell stack that is supplied with fuel by a reformer when the temperature of the reformer is higher than or equal to a threshold temperature; or by a second electrical-energy source composed of an auxiliary battery, as long as the temperature of the reformer is below the threshold temperature;

and of the type provided with an accelerator pedal that can be moved between a rest position and an actuated extreme position corresponding to the maximum mechanical power that can be delivered by the motor as a function of the electric power available for supplying it.

Vehicles powered by an electric motor can be advantageously supplied with electrical energy by a fuel-cell stack.

A fuel-cell stack is composed mainly of two electrodes, an anode and a cathode, which are separated by an electrolyte. This type of cell stack permits direct conversion, to electrical energy, of the energy produced by the following oxidation-reduction reactions:

a reaction of oxidation of a fuel or "carburant", which continuously supplies the anode; and a reaction of reduction of an oxygen carrier, which continuously supplies the cathode.

BACKGROUND OF THE INVENTION

The fuel-cell stacks used to supply electrical energy on board motor vehicles are generally of the solid-electrolyte type, especially with a polymeric electrolyte. Such a cell stack uses especially hydrogen ($H_2$) and oxygen ($O_2$) as the fuel and oxygen carrier respectively.

With this type of cell stack, it is possible to achieve, at the same time, an efficiency, a reaction time and an operating temperature that on the whole are satisfactory for delivering electricity to an electric motor for propulsion of a motor vehicle.

In contrast to combustion engines, which discharge a non-negligible quantity of polluting substances with the exhaust gases, the fuel-cell stack offers in particular the advantage of discharging only water, which is produced by the reduction reaction at the cathode. In addition, the oxygen carrier of a cell stack of the type described in the foregoing can be ambient air, the oxygen ($O_2$) of which becomes reduced.

The cathode generally has an inlet that permits continuous supply with oxygen ($O_2$) or with air, and an outlet that permits evacuation of the excess air or oxygen ($O_2$) as well as evacuation of the water produced during the reduction of oxygen ($O_2$). In general, the anode is generally provided with an inlet through which hydrogen ($H_2$) is introduced.

In the current state of the art, however, the storage of pure hydrogen ($H_2$) on board the vehicle necessitates a volume that is too large to achieve comfortable autonomy. In addition, the logistics of distribution of hydrogen ($H_2$) have not yet become geographically widespread.

It is known that these problems can be overcome by producing hydrogen ($H_2$) directly on board the vehicle from hydrocarbons, especially conventional fuels such as gasoline or natural gas. The hydrogen ($H_2$) is extracted from the gasoline during an operation known as reforming, which necessitates a device known as a reformer.

The gasoline is injected into the reformer together with water and air. The product of reforming is a gas known as reformate, which is composed mainly of hydrogen ($H_2$), carbon monoxide (CO), carbon dioxide ($CO_2$), oxygen ($O_2$) and nitrogen ($N_2$). The anode of the cell stack is then supplied directly with reformate by the reformer.

To be able to produce such a reformate, the reformer must be heated and maintained at a temperature higher than a threshold temperature. For this purpose, the reformer is provided with a heating device. Below this threshold temperature, the reformer cannot supply the cell stack with hydrogen ($H_2$) fuel, and the cell stack therefore cannot produce electrical energy.

However, the threshold temperature of the reformer is higher than the ambient temperature to which the vehicle is likely to be exposed. Thus, when the reformer is cold, the heating device needs a non-negligible time, which can be as much as several minutes, to bring it to temperature. During this time, the electric motor cannot be supplied by the fuel-cell stack, and the operator must wait until the reformer is operating before he can use the motor vehicle.

To permit the operator to use the vehicle quickly after it has been started, it is known that the vehicle can be equipped with a battery of auxiliary accumulators in order to supply the electric motor during the time for heating the reformer. Thus, during heating of the reformer, the motor is supplied with electrical energy by the auxiliary battery and, when the reformer has reached its threshold temperature, the electrical-energy supply source automatically switches from the battery to the fuel-cell stack.

However, such a battery generally cannot deliver as much electrical power to the motor as a fuel-cell stack. This has consequences for the maximum power that the motor can deliver instantaneously and thus for the driving sensations of the operator.

To permit the operator to control the electric motor, the vehicle is generally provided with an accelerator pedal, which can be moved between a rest position and a maximum position, which corresponds to the maximum power that can be delivered by the motor as a function of the electrical power that can be released by the fuel-cell stack. The pedal is also capable of occupying a threshold position, which is situated between the rest position and the actuated maximum position, and which corresponds to the maximum power that can be delivered by the motor when it is being supplied by the battery.

When the motor is being supplied by the battery, the actuation of the accelerator pedal from the rest position to the threshold position is felt as a continuous increase of power by the operator. The actuation of the accelerator pedal beyond the threshold position then has no effect on the power delivered by the motor, contrary to what the operator expects when the motor is being supplied normally by the fuel-cell stack.

In addition, when the supply source of the motor changes over automatically from the auxiliary battery to the fuel-cell stack, and when the accelerator pedal is actuated beyond the threshold position, the motor is suddenly supplied by a greater electrical power. The abrupt increase of power delivered by the motor as a consequence is then capable of surprising the operator and/or of causing an accident.

U.S. Pat. No. 6,447,939 B1 describes a device in which, when a "quick down" is detected during startup of the reforming phase, the quantity of electrical energy necessary for startup of the reformer is limited and the quantity of electrical energy distributed to the motor is increased by giving priority to the supply of the motor.

SUMMARY OF THE INVENTION

The object of the present invention is to provide an improved motor vehicle equipped with means for varying the actuated extreme position of the accelerator pedal.

The present invention proposes a vehicle of the type described in the foregoing, characterized in that it is provided with means for varying the actuated extreme position of the pedal as a function of a parameter representative of the electrical power available to supply the motor.

According to other characteristics of the invention:

the said representative parameter is the temperature of the reformer;

when the temperature of the reformer is higher than the threshold temperature, the said means automatically vary the actuated extreme position of the accelerator pedal between a threshold position corresponding to the electrical power that can be released by the battery and a maximum position corresponding to the electrical power that can be delivered by the fuel-cell stack;

the said means that vary the actuated extreme position of the pedal are controlled by the action of the operator;

the said means are controlled by the action of the operator via a manual control device, which is neutralized as long as the temperature of the reformer is below the threshold temperature;

the said means vary the actuated extreme position of the pedal when the accelerator pedal is situated between the rest position and an intermediate position that is situated between the rest position and the threshold position;

the said means automatically vary the actuated extreme position of the pedal after a delay time;

the vehicle is provided with means for increasing the resistance to displacement of the accelerator pedal from the threshold position to the maximum position, the said means being actuated automatically and temporarily;

the vehicle is provided with a warning device that transmits a warning signal to alert the operator when the temperature of the reformer is higher than the threshold temperature;

the said means are provided with a retractable stop, which can be moved between an active state in which the displacements of the accelerator pedal are limited between the rest position and the threshold position, and an inactive state in which the pedal is able to reach the maximum position.

BRIEF DESCRIPTION OF THE DRAWINGS

Other characteristics and advantages of the invention will become apparent by reading the detailed description hereinafter, which will be understood by referring to the attached drawings, wherein:

FIG. 2 is a view of the accelerator pedal of the vehicle represented in FIG. 1, equipped with a device for varying its actuated extreme position according to the teachings of the invention;

FIG. 3 is a sectional view of the pedal and of the device in section plane 3—3 of FIG. 2;

FIG. 5 represents the pedal of FIG. 2, in this case equipped with an alternative version of the device for varying its actuated extreme position;

DETAILED DESCRIPTION OF PREFERRED EMBODIMENTS

In the description hereinafter, there will be adopted, on a non-limitative basis, a longitudinal, vertical and transverse orientation indicated by the coordinate system L, V, T of FIG. 2.

Figure 1:
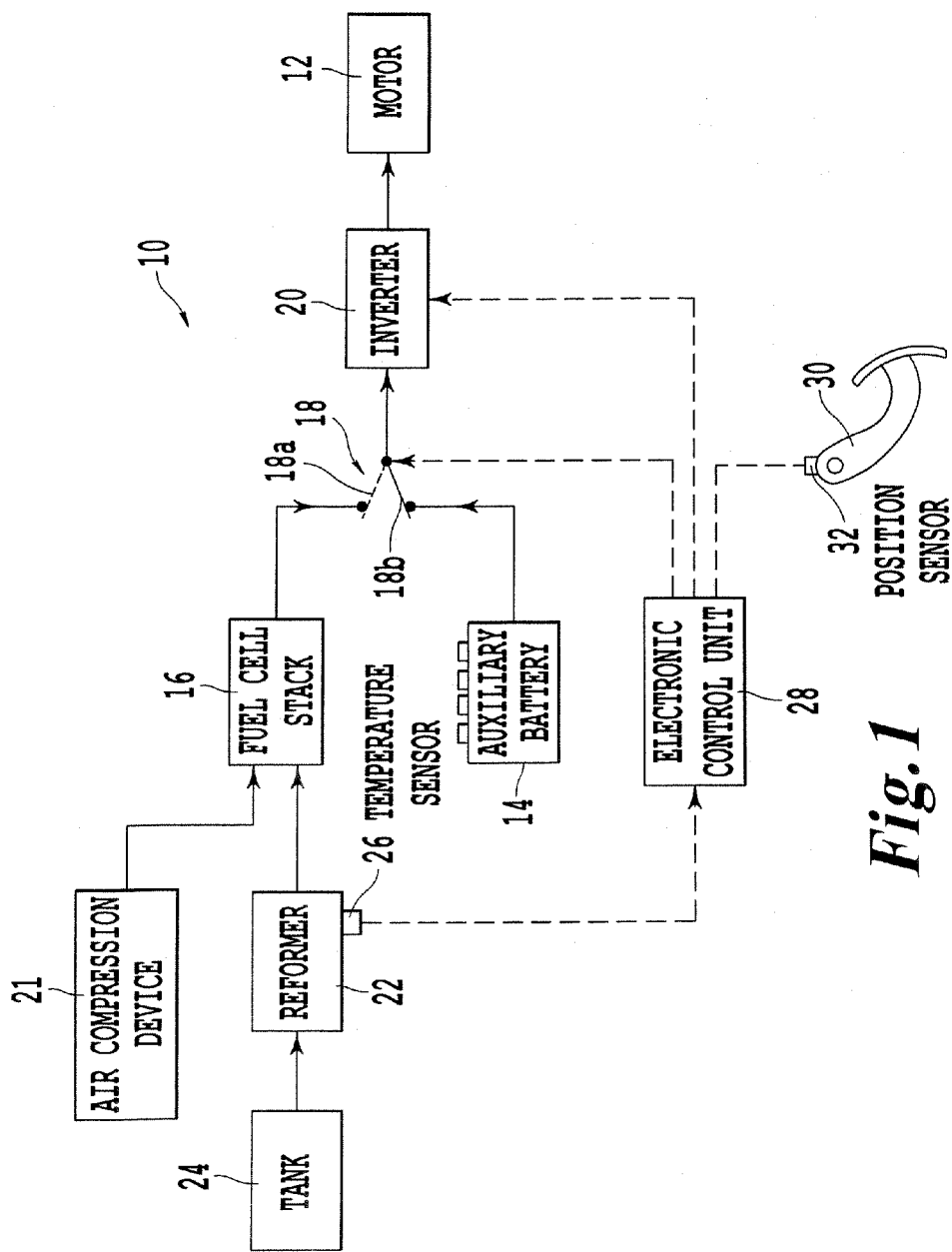
FIG. 1 schematically represents a motor vehicle designed according to the teachings of the invention.

FIG. 1 schematically represents a motor vehicle 10 provided with an electrical propulsion motor 12. Vehicle 10 is also provided with an auxiliary battery 14 and a fuel-cell stack 16, which in this case are capable of supplying motor 12 successively with electrical energy.

The electrical supply circuit of motor 12, which is represented by fine continuous lines, is provided with a selector switch 18, which is intended to select the electrical-energy supply source of motor 12.

Thus selector switch 18 can occupy a primary position 18a, in which fuel-cell stack 16 supplies motor 12 with electrical energy, or an auxiliary position 18b, in which battery 14 supplies motor 12 with electrical energy. In this case an inverter 20 is integrated into the electrical supply circuit between switch 18 and motor 12.

Fuel-cell stack 16 has already been described in the introduction. It is supplied with an oxygen carrier, which in this case is oxygen $O_2$, and with fuel, which in this case is hydrogen $H_2$, via a supply circuit, which is represented in bold continuous lines in FIG. 1.

The cell stack is supplied with oxygen carrier by an air-compression device 21.

Fuel-cell stack 16 is supplied with fuel by a reformer 22, which extracts hydrogen $H_2$ from a hydrocarbon such as gasoline. The hydrogen that supplies reformer 22 is contained in a tank 24.

To be able to function, reformer 22 must be heated and maintained at a temperature higher than a threshold temperature Ts. To this end, reformer 22 is equipped with a heating device (not illustrated).

As has already been explained in the introduction, the threshold temperature Ts of reformer 22 is higher than the ambient temperature to which vehicle 10 is likely to be exposed. Thus, when the operator starts vehicle 10 from cold condition, a non-negligible time for heating of reformer 22, which can be as long as several minutes, is necessary to bring reformer 22 up to its threshold temperature Ts.

Reformer 22 is therefore provided with a temperature sensor 26, which transmits a signal representative of the temperature Tm of reformer 22 to an electronic control unit 28. The exchange lines over which signals are received or transmitted by electronic control unit 28 are represented by broken lines in FIG. 1.

After it has received the measurement Tm of the temperature of reformer 22, electronic control unit 28 compares the measured temperature Tm of reformer 22 with the threshold temperature Ts:

if the temperature Tm of reformer 22 is lower than the threshold temperature Ts, electronic control unit 28 selects auxiliary position 18b of switch 18;

if the temperature Tm of reformer 22 is higher than the threshold temperature Ts, electronic control unit 28 selects primary position 18a of switch 18.

The passenger compartment (not illustrated) of vehicle 10 is provided in this case with an accelerator pedal 30, which is mounted pivotally between a rest position P0 corresponding to zero power delivered by motor 12 and a maximum position P2 corresponding to the maximum power delivered by motor 12 when it is being supplied by fuel-cell stack 16. Thus pedal 30 permits the operator to control the power delivered by motor 12, for example in a manner proportional to the angular travel of accelerator pedal 30.

Pedal 30 can also occupy a threshold position P1, which is situated between rest position P0 and maximum position P2. Threshold position P1 corresponds to the power that motor 12 can deliver when it is being supplied by auxiliary battery 14. In other words, when motor 12 is being supplied by auxiliary battery 14, the power delivered by motor 12 remains constant beyond this threshold position P1.

The functional principle of pedal 30 is as follows.

A position sensor 32 of pedal 30 transmits a signal representative of the angular position of pedal 30 to an electronic control unit 28. Electronic control unit 28 then transmits a signal destined for inverter 20, so that the said inverter "orders", from the selected electrical energy source 14 or 16, the electrical power necessary for motor 12 to deliver the required mechanical power.

In the rest of the description, we will call actuated extreme position of pedal 30 the position to which the operator can depress pedal 30 before reaching the stop.

According to the teachings of the invention, vehicle 10 is provided with a device 34 for varying the actuated extreme position of pedal 30 and in particular for limiting the displacements of pedal 30 between rest position P0 and maximum position P2, or between rest position P0 and threshold position P1.

We will now describe pedal 30 equipped with this device 34 by referring to FIGS. 2 and 3.

Pedal 30 is composed mainly of a crank 36, vertical overall, at the lower end of which there is mounted a pad 38 intended to receive a force applied by the foot of the Operator. The upper end of crank 36 is mounted to rotate relative to the vehicle structure, around a transverse axis A.

According to this embodiment of the invention, the upper end of the crank is provided with a head 40, in which there is formed a substantially longitudinal, oblong groove 42. Front end 44 of groove 42 is intended to cooperate with a retractable stop 46, which is integral with the structure of vehicle 10, in order to limit the displacements of pedal 30 between rest position P0 and threshold position P1.

Retractable stop 46 is mounted to slide transversely in a box 48, which is integral with the structure of vehicle 10 and is mounted close to head 40 of pedal 30.

Retractable stop 46 is controlled by an electromagnet 50 mounted in the interior of box 48. By means of electromagnet 50, electronic control unit 28 controls stop 46, in particular between:

an active state (represented in FIG. 3), in which stop 46 is able to cooperate with front end face 44 of groove 42 in order to limit displacements of pedal 30 between its rest position P0 and its threshold position P1, threshold position P1 then being the actuated extreme position of pedal 30; and an inactive state (not illustrated), in which stop 46 is retracted by sliding transversely to the right according to FIG. 3, in such a way as to permit displacements of pedal 30 between its rest position P0 and its maximum position P2, maximum position P2 then being the actuated extreme position.

Figure 4:
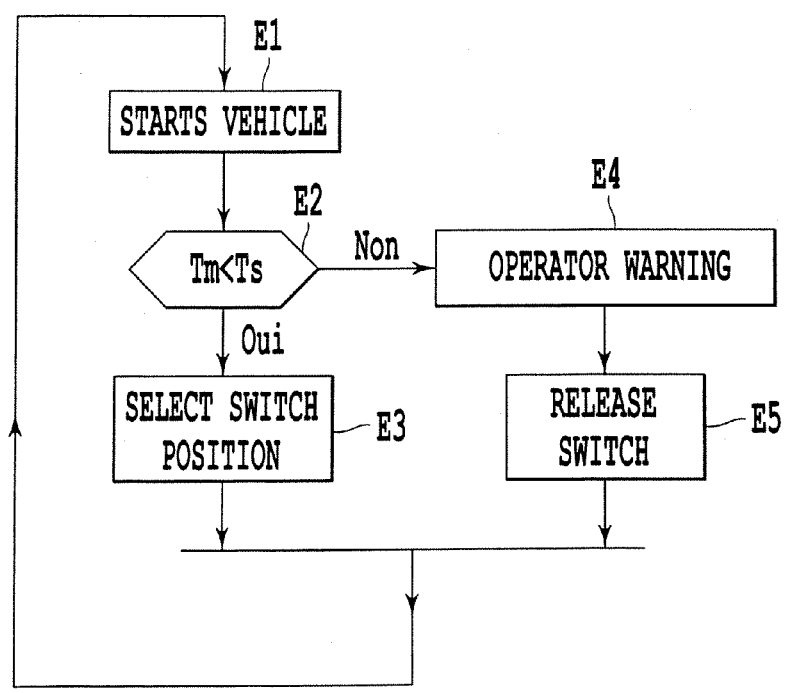
FIG. 4 is a diagram illustrating the functioning of the vehicle represented in FIG. 1.

We will now describe the functioning of vehicle 10 by referring to the diagram of FIG. 4.

During a first step E1, the operator starts vehicle 10, then during a second step E2, temperature sensor 26 delivers the temperature Tm of reformer 22 to electronic control unit 28. Electronic control unit 28 then compares the temperature Tm of reformer 22 with the threshold temperature Ts.

If the temperature Tm of reformer 22 is lower than the threshold temperature Ts, then electronic control unit 28 initiates a limitation step E3, in the course of which it selects auxiliary position 18b of switch 18 in such a way that motor 12 is supplied by auxiliary battery 14.

During step E3, and after selection of switch 18 in auxiliary position 18b, electronic control unit 28 activates retractable stop 46 in such a way that the extreme actuated position of pedal 30 corresponds to threshold position P1.

Thus, when the operator actuates accelerator pedal 30, the latter is displaced freely between rest position P0 and threshold position P1, groove 42 being traveled freely by stop 46.

When the operator actuates pedal 30 as far as threshold position P1, front end face 44 of groove 42 abuts against retractable stop 46, and pedal 30 is then in actuated extreme position.

When the temperature Tm of reformer 22 is higher than or equal to the threshold temperature Ts, electronic control unit 28 initiates an operator-warning step E4, in the course of which the operator is alerted by means (not illustrated), for example by turning on an indicator light on the control panel of the vehicle, or by an acoustic signal, that an energy source of greater capacity than auxiliary battery 14 is available, or in other words that fuel-cell stack 16 is available.

Step E4 is followed by a release step E5, in the course of which electronic control unit 28 causes switch 18 to assume primary position 18a, so that fuel-cell stack 16 supplies electric motor 12.

Then, when switch 18 is in primary position 18a, electronic control unit 28 selects the inactive state of retractable stop 46, so that the actuated extreme position of pedal 30 corresponds to its maximum position P2. Pedal 30 can then be displaced freely between its rest position P0 and its maximum position P2.

According to another embodiment of the invention, during release step E5, electronic control unit 28 selects the inactive state of retractable stop 46 only after a time delay, for example of several seconds, after the indicator light goes on. Alerted by the indicator light, the operator thus has time to become aware that the actuated extreme position of pedal 30 will be modified and as a result he is less likely to depress accelerator pedal 30 involuntarily.

According to another embodiment of the invention, during release step E5, the transition of retractable stop 46 to the inactive state is brought about not only as a function of the temperature Tm of reformer 22 but also as a function of the position of accelerator pedal 30. Thus retractable stop 46 is moved to the inactive state only when:

the temperature Tm of reformer 22 is higher than or equal to the threshold temperature Ts;

and when pedal 30 is situated between its rest position P0 and an intermediate position P1', which is situated on the low side of threshold position P1.

Thus, when motor 12 is being supplied by auxiliary battery 14 and the operator is maintaining his pressure on pedal 30 so as to lock it in its actuated extreme position (or in other words its threshold position P1), during the transition of switch 18 from auxiliary position 18b to primary position 18a, the operator must necessarily relax his pressure on pedal 30 to allow the latter to move to intermediate position P1', before he is able once again to displace the pedal between its threshold position P1 and its maximum position P2.

In this way, even if the operator does not notice the indicator light, he cannot depress accelerator pedal 30 involuntarily beyond threshold position P1.

In another alternative embodiment of the invention, during step E5, electronic control unit 28 controls a manual intermediate device (not illustrated) for tripping retractable stop 46, which is situated in the passenger compartment of vehicle 10.

As long as the temperature Tm of reformer 22 is lower than the threshold temperature Ts, the operator is unable to act on the manual tripping device, because the latter is inhibited or neutralized by electronic control unit 28.

When the temperature Tm of reformer 22 is higher than or equal to the threshold temperature Ts, electronic control unit 28 activates the manual tripping device. Thus, then the operator is alerted by the fact that the indicator light goes on, he himself manually trips the device, which initiates the transition of retractable stop 46 to the inactive state.

The manual tripping device is, for example, a pushbutton connected electrically to electronic control unit 28.

According to another embodiment of the invention, stop 46 is temporarily able to occupy a semi-active state, which is intended to be tripped during release step E5 and in which the displacements of pedal 30 between its threshold position P1 and its maximum position P2 require that the operator apply on pad 38 a pressure greater than the pressure required when stop 46 is inactive.

This embodiment relies on an alternative version 52 of device 34 for varying the actuated extreme position of the pedal represented in FIGS. 2 and 3. This alternative version is represented in FIGS. 5, 6a, 6b, 6c and 6d.

We will now describe the structural differences between this device 52 and the previously described device 34.

In this case retractable stop 46 is provided with a transverse tin 54 which is intended to cooperate with a stop shoulder 55 integral with the box when stop 46 is in active state, in such a way that stop 46 is fixed relative to box 48 when front end face 44 of the pedal is brought into contact with stop 46.

Box 48 is perforated by a substantially longitudinal opening 56 intended to guide stop 46 in longitudinal sliding manner when the said stop is in a semi-active state in which stop 46 can move relative to box 48, and when pedal 30 is being displaced between its threshold position P1 and its maximum position P2.

Box 48 is also provided with a compression spring 58, the orientation of which is longitudinal on the whole relative to the orientation of FIG. 2, and on which spring stop 46 is braced. Spring 58 is intended in particular to exert an additional force opposing the pressure that the operator applies on pedal 30 when the stop is in semi-active position. In addition, spring 58 makes it possible to retract stop 46 elastically to the longitudinal position that it occupies in the active or inactive state.

Box 48 is provided with an electromagnet 50, which controls a transverse rod 60 provided with a notch 62, which is intended to receive a longitudinal dog point carried by stop 46 to permit transverse displacement of stop 46.

We will now describe the functioning of device 52 with reference to FIGS. 6a, 6b, 6c and 6d.

Figure 6A:
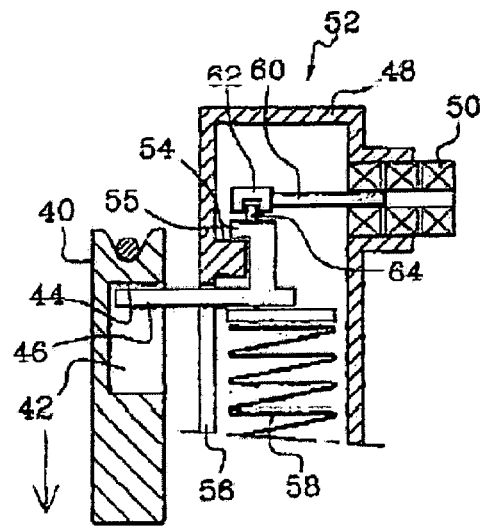
FIG. 6a is a sectional view in section plane 6—6 of FIG. 5, representative of the device in an active state.

FIG. 6a represents device 52 in the active state. Stop 46 is then engaged in groove 42, and it is immobilized as regards longitudinal translation relative to box 48 by stop shoulder 55, which blocks dog point 54. The displacements of pedal 30 are then limited between rest position P0 and threshold position P1.

Figure 6B:
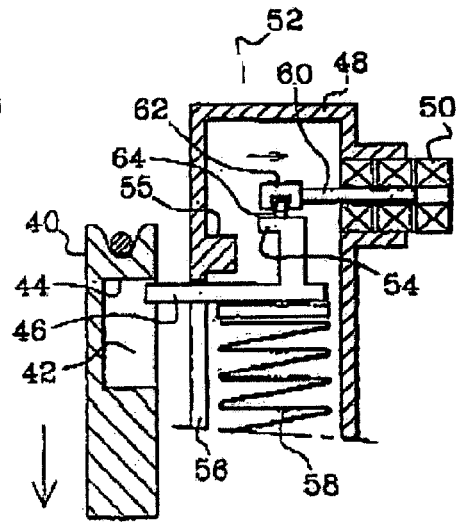
FIG. 6b is a view analogous to that of FIG. 6a, representative of the device in semi-active state.
Figure 6C:
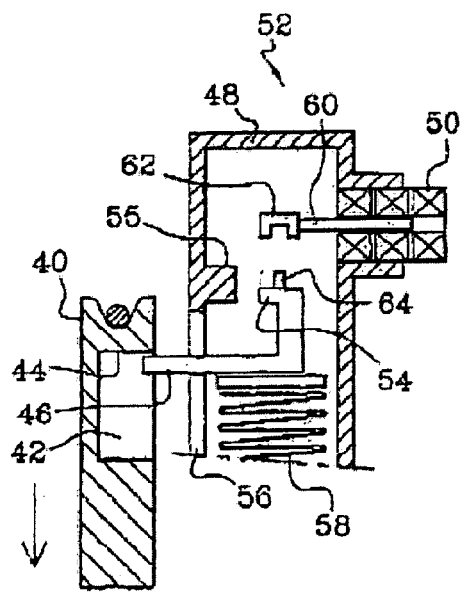
FIG. 6c is a view analogous to that of FIG. 6b, representative of the pedal actuated beyond a threshold position.

FIGS. 6b and 6c show device 52 in the semi-active state. Electromagnet 50 then acts on rod 60, which undergoes a first transverse translation to the right according to the orientation of FIG. 6b, rod 60 and stop 46 being made integral by nesting of dog point 64 in notch 62. Thus stop 46 is also displaced transversely to the right in such a way that stop 46 is always engaged in notch 42 and in such a way that lug 54 is no longer adjacent to stop shoulder 55.

Thus, as illustrated in FIG. 6b, when the operator actuates the pedal beyond its threshold position P1, front end face 44 of pedal 30 transmits the pressure of pedal 30 to stop 46. Since the latter is no longer blocked longitudinally by stop shoulder 55, it is free to be displaced into opening 56 of box 48. The longitudinal displacement of stop 46 compresses spring 58, which then exerts an opposing force on stop 46 and therefore on pedal 30.

Figure 6D:
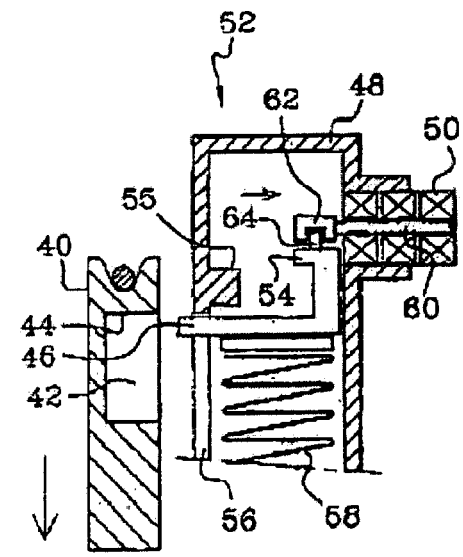
FIG. 6d is a view analogous to that of FIG. 6a, representative of the device in its inactive state.

When pedal 30 is returned to its threshold position P1, dog point 64 once again becomes engaged in notch 62 of rod 60. Device 52 can then be inactivated, as illustrated in FIG. 6d. Electromagnet 50 acts on rod 60 in such a way that the latter undergoes a second transverse translation to the right. Rod 60 therefore carries stop 46 in transverse translation to the right according to FIG. 6d in such a way that stop 46 is completely disengaged from groove 42. Pedal 30 is then capable of being displaced between its rest position P0 and its maximum position P2.

According to this embodiment, when the temperature Tm of reformer 22 is higher than or equal to the threshold temperature Ts, electronic control unit 28 temporarily selects the semi-active stage of stop 46. The operator therefore has the feeling that he can actuate pedal 30 beyond its threshold position P1, but he must make a conscious effort to overcome the resistance of spring 58.

A few seconds after the transition of stop 46 to-the semi-active state, electronic control unit 28 causes stop 46 to change over to the inactive state, and so the operator has had the opportunity to become aware of the increase of power that motor 12 can deliver.

It will be understood that simple mechanical inversions can constitute alternative embodiments of the invention.

The invention claimed is:

1. A motor vehicle comprising:
    an electric propulsion motor capable of being supplied with electrical energy:
        by a first electrical-energy source including a fuel-cell stack that is supplied with fuel by a reformer when a temperature of the reformer is higher than or equal to a threshold temperature; or
        by a second electrical-energy source including an auxiliary battery, as long as the temperature of the reformer is below the threshold temperature;

an accelerator pedal configured to be moved between a rest position and an actuated extreme position corresponding to a maximum mechanical power that can be delivered by the motor as a function of electric power available for supplying the motor; and means for varying the actuated extreme position of the pedal as a function of a parameter representative of electrical power available to supply the motor.

2. A vehicle according to claim 1, wherein the representative parameter is the temperature of the reformer.

3. A vehicle according to claim 2, wherein, when the temperature of the reformer is higher than the threshold temperature, the means for varying automatically varies the actuated extreme position of the accelerator pedal between a threshold position corresponding to the electrical power that can be released by the battery and a maximum position corresponding to electrical power that can be delivered by the fuel-cell stack.

4. A vehicle according to claim 3, wherein the means for varying is controlled by action of an operator.

5. A vehicle according to claim 4, wherein the means for varying is controlled by the action of the operator via a manual control device, which is neutralized as long as the temperature of the reformer is below the threshold temperature.

6. A vehicle according to claim 4, wherein the means for varying varies the actuated extreme position of the pedal when the accelerator pedal is situated between the rest position and an intermediate position that is situated between the rest position and the threshold position.

7. A vehicle according to claim 3, wherein the means for varying automatically varies the actuated extreme position of the pedal after a delay time.

8. A vehicle according to claim 3, further comprising means for increasing resistance to displacement of the accelerator pedal from the threshold position to the maximum position, the means for increasing resistance being actuated automatically and temporarily.

9. A vehicle according to claim 1, further comprising a warning device that transmits a warning signal to alert an operator when the temperature of the reformer is higher than the threshold temperature.

10. A vehicle according to claim 3, wherein the means for varying includes a retractable stop, configured to be moved between an active state in which displacements of the accelerator pedal are limited between the rest position and the threshold position, and an inactive state in which the pedal is able to reach the maximum position.

* * * * *